US012689042B2

(12) United States Patent
Coole et al.

(10) Patent No.: US 12,689,042 B2
(45) Date of Patent: Jul. 21, 2026

(54) MEMBRANE-SEAL ASSEMBLY

(71) Applicant: JOHNSON MATTHEY HYDROGEN TECHNOLOGIES LIMITED, London (GB)

(72) Inventors: Jake Coole, Swindon (GB); Angus Dickinson, Swindon (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 845 days.

(21) Appl. No.: 18/003,822

(22) PCT Filed: Sep. 7, 2021

(86) PCT No.: PCT/GB2021/052292
§ 371 (c)(1),
(2) Date: Dec. 29, 2022

(87) PCT Pub. No.: WO2022/053789
PCT Pub. Date: Mar. 17, 2022

(65) Prior Publication Data
US 2023/0282843 A1 Sep. 7, 2023

(30) Foreign Application Priority Data

Sep. 8, 2020 (GB) ..................................... 2014066

(51) Int. Cl.
| | |
|---|---|
| *H01M 8/0276* | (2016.01) |
| *H01M 4/86* | (2006.01) |
| *H01M 8/10* | (2016.01) |
| *H01M 8/1004* | (2016.01) |

(52) U.S. Cl.
CPC ....... *H01M 8/0276* (2013.01); *H01M 4/8605* (2013.01); *H01M 8/1004* (2013.01); *H01M 2008/1095* (2013.01)

(58) Field of Classification Search
CPC ............. H01M 8/0276; H01M 8/0273; H01M 8/1004; H01M 4/8605
See application file for complete search history.

(56) References Cited

U.S. PATENT DOCUMENTS

| | | | |
|---|---|---|---|
| 6,716,550 B1 | 4/2004 | Kirby | |
| 8,283,087 B2 | 10/2012 | Obika | |
| 2007/0264557 A1 | 11/2007 | Kobayashi et al. | |
| 2011/0003232 A1 | 1/2011 | Obika | |
| 2013/0224623 A1 | 8/2013 | Barnwell | |
| 2014/0302418 A1 | 10/2014 | Bauer et al. | |
| 2016/0181630 A1 | 6/2016 | Bauer et al. | |

FOREIGN PATENT DOCUMENTS

| | | |
|---|---|---|
| CN | 108054407 B | 12/2018 |
| EP | 0631337 A2 | 12/1994 |
| JP | 2007018957 A | 1/2007 |
| JP | 2009-211813 A | 9/2009 |
| JP | 2012015041 A | 1/2012 |
| JP | 2016-134289 A | 7/2016 |
| JP | 6432398 B2 | 12/2018 |
| WO | 00/24074 A1 | 4/2000 |
| WO | 2015/145127 A1 | 10/2015 |
| WO | 2015/145129 A1 | 10/2015 |
| WO | 2016/083785 A1 | 6/2016 |

*Primary Examiner* — Sarah A. Slifka

(74) *Attorney, Agent, or Firm* — BakerHostetler

(57) ABSTRACT

The present invention provides a membrane-seal assembly which comprises a central region, an inner peripheral border region and an outer peripheral border region, wherein the inner and outer peripheral border regions comprise different seal materials.

25 Claims, 4 Drawing Sheets

MEMBRANE-SEAL ASSEMBLY

FIELD OF THE INVENTION

The present invention relates to a membrane-seal assembly and its use in an electrochemical device, in particular its use in a proton exchange membrane fuel cell.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell the ion-conducting membrane is proton conducting, and protons, produced at the anode, are transported across the ion-conducting membrane to the cathode, where they combine with oxygen to form water.

A principal component of the proton exchange membrane fuel cell is a five-layer construct conventionally known as a membrane electrode assembly. The central layer is the polymer ion-conducting membrane. On either face of the ion-conducting membrane there is a catalyst layer containing an electrocatalyst designed for the specific electrolytic reaction. The catalyst layers also generally comprise a proton conducting material, such as a proton conducting polymer, to aid transfer of protons from the anode electrocatalyst to the ion-conducting membrane and/or from the ion-conducting membrane to the cathode electrocatalyst. Adjacent to each catalyst layer there is a gas diffusion layer. The gas diffusion layer must allow the reactants to reach the catalyst layer and must conduct the electric current that is generated by the electrochemical reactions. Therefore, the gas diffusion layer must be porous and electrically conducting. This five layer construct is conventionally known as a membrane electrode assembly.

Conventionally, the membrane electrode assembly is constructed so that the central polymeric ion-conducting membrane extends to the edge of the membrane electrode assembly, with the gas diffusion layers and catalyst layers being smaller in area than the membrane such that there is an area around the periphery of the membrane electrode assembly which comprises ion-conducting membrane only. The area where no catalyst layer is present is a non-electrochemically active region. Separate film layers, for example sub-gaskets, formed from non-ion conducting polymers are generally positioned around the edge region of the membrane electrode assembly on the exposed surfaces of the ion-conducting membrane where no catalyst layer is present (often overlapping the edge of the catalyst layer). These films provide a seal to prevent escape of reactant and product gases, to reinforce and strengthen the edge of the membrane electrode assembly and to provide a suitable surface for supporting subsequent components such as sub-gaskets or elastomeric gaskets. An adhesive layer may be present on one or both surfaces of the seal film layer. The layers or components in the membrane electrode assembly are typically bonded by a lamination process. Alternatively, a sealing material can be deposited in a picture frame type arrangement around the central ion-conducting membrane for example as disclosed in WO 2015/145127.

SUMMARY OF THE INVENTION

In conventional membrane electrode assembly constructions involving the use and bonding together of separate sealing films and ion-conducting membranes or catalyst coated ion-conducting membranes there remain durability issues. These issues may be due to, for example, the mechanical stresses that can build up in the ion-conducting membrane and at the edges of the ion-conducting membrane electrode assembly at the interface where the seal overlaps or frames the ion-conducting membrane. Such mechanical stresses can occur due to dimensional changes which may result during hydration and dehydration as the operational conditions of a fuel cell change. In particular, these stresses cause a weakness in the ion-conducting membrane that may lead to tearing of the ion-conducting membrane in the edge regions close to the interface with the seal and ultimate membrane electrode assembly and fuel cell failure. Therefore, there is a need to improve the durability and lifetime of the membrane electrode assembly.

Accordingly, the present invention provides, in a first aspect, a membrane-seal assembly comprising a first side and second side, the membrane-seal assembly comprising:

(i) a central region having a first face and a second face which correspond with the first and second sides of the membrane-seal assembly respectively, the central region comprising an ion-conducting material;

(ii) an inner peripheral border region having a first face and a second face which correspond with the first and second sides of the membrane-seal assembly respectively, the inner peripheral border region comprising a first seal material, wherein the inner peripheral border region surrounds the central region;

(iii) an outer peripheral border region having a first face and a second face which correspond with the first and second sides of the membrane-seal assembly respectively, the outer peripheral border region comprising a second seal material, wherein the outer peripheral border region surrounds the inner peripheral border region;

wherein the first and second seal materials are different.

The use of two different sealing materials in the inner and outer peripheral border regions which can have different chemical and mechanical properties allows for targeted use of more chemically robust and potentially more expensive and more difficult to handle materials. In particular, sealing materials may be used in the inner peripheral border region which avoid issues relating to mechanical stress at the interface with the central region. At the same time, materials which are easier to handle can be used for the outer peripheral border region. In a specific aspect, the inventors have found that it can be beneficial to use a first material for the inner peripheral border region which has a Young's modulus which is less than the Young's modulus of the second seal material in the outer peripheral border region. This arrangement has the benefit that the inner peripheral border region may absorb mechanical stress from the interface with the ion-conducting central region, whilst the rigidity required in the outer peripheral border region to support, for example, sub-gaskets is maintained.

In a second aspect, the present invention provides a sub-gasketed membrane-seal assembly comprising a membrane-seal assembly according to the first aspect of the invention, a first sub-gasket at the first side of the membrane-seal assembly and a second sub-gasket at the second side of the membrane-seal assembly, wherein the first sub-gasket is in contact with the first face of the outer peripheral border region and the second sub-gasket is in contact with the second face of the outer peripheral border region.

In a third aspect, the present invention provides a catalysed membrane-seal assembly comprising a membrane-seal assembly according to the first aspect of the invention and a first catalyst layer on the first face of the central region, wherein the catalyst layer has first and second faces, wherein the second face of the catalyst layer is in contact with the first face of the central region.

In a fourth aspect, the present invention provides a sub-gasketed catalysed membrane-seal assembly comprising a catalysed membrane-seal assembly according to the third aspect of the invention, a first sub-gasket at the first side of the catalysed membrane-seal assembly and a second sub-gasket at the second side of the catalysed membrane-seal assembly, wherein the first sub-gasket is in contact with the first face of the outer peripheral border region and the second sub-gasket is in contact with the second face of the outer peripheral border region.

In a fifth aspect, the present invention provides a sub-gasketed membrane-seal electrode assembly comprising a sub-gasketed catalysed membrane-seal assembly according to the fourth aspect of the invention, a first gas diffusion layer at the first side of the sub-gasketed catalysed membrane-seal assembly and a second gas diffusion layer at the second side of the sub-gasketed catalysed membrane-seal assembly.

In a sixth aspect, the present invention provides a fuel cell comprising a membrane-seal assembly according to the first aspect of the invention, sub-gasketed membrane-seal assembly according to the second aspect of the invention, a catalysed membrane-seal assembly according to the third aspect of the invention, a sub-gasketed catalysed membrane-seal assembly according to the fourth aspect of the invention, or a sub-gasketed membrane-seal electrode assembly according the fifth aspect of the invention.

In a seventh aspect, the present invention provides a method of preparing a membrane-seal assembly according to the first aspect of the invention, said method comprising the steps of:

(a) depositing an ion-conducting material and forming the central region;

(b) depositing a first seal material and forming the inner peripheral border region;

(c) depositing a second seal material and forming the outer peripheral border region.

In an eighth aspect, the present invention provides a method of preparing a catalysed membrane-seal assembly according to the third aspect of the invention, said method comprising the steps of:

(d) preparing a membrane-seal assembly by the method of the seventh aspect of the invention;

(e) depositing a catalyst component on the central region and forming the first catalyst layer on the central region.

In a ninth aspect, the present invention provides a method of preparing a catalysed membrane-seal assembly according to the third aspect of the invention, said method comprising the steps of:

(f) depositing a catalyst component on a carrier material and forming a first catalyst layer;

(g) depositing an ion-conducting material on the catalyst layer and forming the central region;

(i) depositing a first seal material and forming the inner peripheral border region;

(j) depositing a second seal material and forming the outer peripheral border region.

DETAILED DESCRIPTION OF THE INVENTION

Figure 1A:
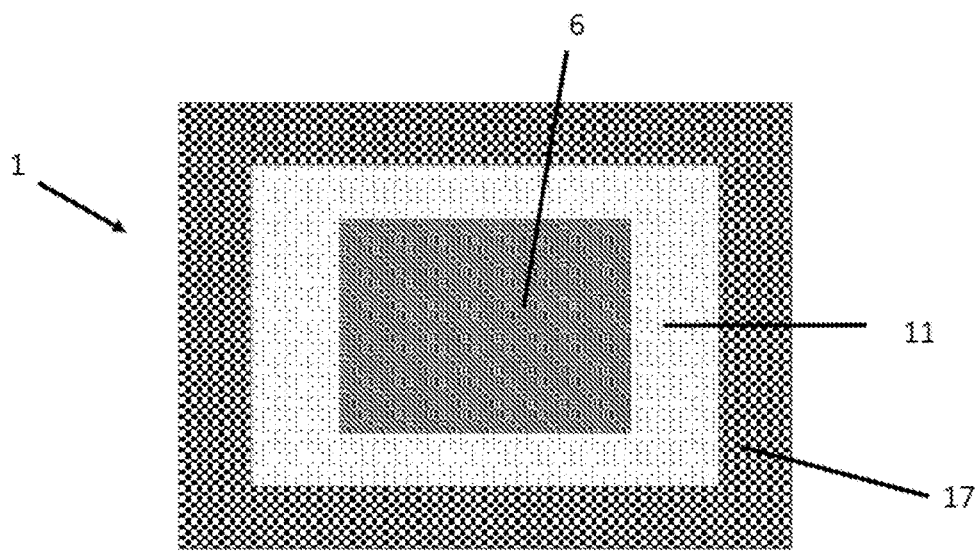
FIG. 1*a* is a plan view of a membrane-seal assembly according to the invention.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The central region is an ion-conducting membrane. The ion-conducting material is suitably a proton-conducting polymer or an anion-conducting polymer, such as a hydroxyl anion-conducting polymer. Preferably, the ion-conducting material is a proton-conducting polymer, suitably a perfluorinated sulphonic acid material. Examples of suitable proton-conducting polymers include perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.) and perfluorosulphonic acid ionomer material supplied by 3M®. Alternatively, the ion-conducting material may be based on a sulphonated hydrocarbon membrane such as those available from FuMA-Tech GmbH as the Fumapem® P, E or K series of products, or from JSR Corporation, Toyobo Corporation, and others.

The central region may comprise one or more hydrogen peroxide decomposition catalysts. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria). The central region may comprise a recombination catalyst, in particular a catalyst for the recombination of unreacted hydrogen and oxygen, that can diffuse into the central region from an anode and a cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

The first seal material and the second seal material should both be non-ion conducting. Accordingly, the inner peripheral border region is a seal and the outer peripheral border region is a seal. Preferably, the inner peripheral border region does not comprise second seal material and the outer peripheral border region does not comprise first seal material. The first seal material and the second seal material are suitably different in the sense that they have different chemical compositions. Put another way, they are different chemical substances. Preferably, the first seal material has a Young's modulus which is less than the Young's modulus of the second material. Young's modulus defines the relationship between stress and strain in a material when within the elasticity regime and this property can be measured using equipment such as a tensiometer or dynamic mechanical analyser. Preferably, The Young's modulus is obtained using the measurement defined in ASTM E111-17 using a Houndsfield tensiometer. The relationship between the materials must be true over the range of operating temperatures of the fuel cell suitably −20 to 180° C., preferably −20 to 120° C. The first seal material may suitably also have a Young's modulus which is greater than the Young's modulus of the ion-conducting material in the central region. Suitably, the Young's modulus of the first seal material is no more than 3 GPa, typically no more than 2.5 GPa, for example no more than 2 GPa. Suitably, the Young's modulus of the first seal material is at least 200 MPa. The first seal material should also be compatible with the fuel cell environment. For example, the first seal material must be able to withstand temperatures in the range of and including −20 to 180° C., suitably −20 to 120° C. as well as the presence of water, hydrogen and/or oxygen. The first seal material suitably has lower gas permeability than the ion-conducting material under fuel cell operating conditions, preferably it is not permeable to gas under fuel cell operating conditions. The first seal material should be compatible with the ion-conducting material and the second seal material. For example, the first seal material must be capable of forming a gas tight seal with the ion-conducting material in the central region and the second seal material in the outer peripheral border region. A skilled person is aware of the interactions which must be considered when creating a gas tight seal. For example, a gas tight seal can be formed by van der Waal's interactions providing the materials are applied such that they form a close fit. The edges of the central region, the inner peripheral border region and the outer peripheral border region which form interfaces between the regions may individually be profiled to optimise contact to form a gas tight seals. There may be a blended region in the planar (x and/or y) direction at the interface between the central region and the inner peripheral border region and/or the interface between the inner peripheral border region and the outer peripheral border region. In the blended region, if the materials are miscible, there may be complete mixing of the two materials, such that distribution of the components throughout the blended region is uniform. Alternatively, if the materials are not miscible, in the blended region there may be one or more 'islands' of one of the materials.

Suitable first seal materials include silicone rubbers including polysiloxanes and polydimethylsiloxanes. Suitable first seal materials also include polyvinylidene difluoride (PVDF) homopolymers and copolymers. A preferably PVDF copolymer is poly (vinylidene fluoride-co-hexafluoropropylene), otherwise known as PVDF-HFP. The PVDF-HFP copolymer may have the formula $(-CH_2CF_2-)_x[-CF_2CF(CF_3)-]_y$ in which x is suitably in the range of and including 0.2 to 0.8, preferably 0.4 to 0.6 and y is suitably in the range of and including 0.8 to 0.2, preferably 0.6 to 0.4.

Advantageously, the properties of the inner peripheral border region can be tuned by varying the ratio of x and y.

The second seal material is suitably a polymeric material which, suitably, is conventionally used as a seal material in a fuel cell membrane electrode assembly. Suitable second seal materials include: polyetherimide (PEI), polyimide (PI), polyethersulphone (PES), fluorinated ethylene propylene (FEP), ethylene tetrafluoroethylene (ETFE), Viton®, polyethylene oxide (PEO), polyphenylene ether (PPE), polyethylene terephthalate (PET), polyethylene naphthalate (PEN), polyacrylonitrile (PAN), poly(p-phenylene sulphide) (PPS), polyolefins and silicones. UV curable acrylics and UV curable cationic materials may also be used.

The central region is suitably a planar area in the Cartesian x,y-direction, also called the in-plane direction, which extends through the thickness of the membrane-seal assembly in the Cartesian z-direction, also called the through-plane direction, between first and second faces. The inner peripheral border region is suitably a planar area in the Cartesian x,y-direction which extends around the periphery of the central region and which extends through the thickness of the membrane-seal assembly in the Cartesian z-direction between first and second faces. The outer peripheral border region is suitably a planar area in the Cartesian x,y-direction direction which extends around the periphery of the inner peripheral border region and which extends through the thickness of the membrane-seal assembly in the Cartesian z-direction between first and second faces. The central region, inner peripheral border region and outer peripheral border regions typically each independently have a substantially uniform thickness, which suitably means that the thickness of each region independently does not vary by more than 0.5 μm, typically 0.25 μm across the x,y-plane. Preferably, the thickness of each region is independently identical at any point in the x,y-plane. The thickness of the membrane-seal assembly is not particularly limited and will depend on the intended application. For example, the central region in a typical fuel cell membrane-seal assembly will have a thickness of at least 5 μm, suitably at least 10 μm. The central region in a typical fuel cell membrane-seal assembly will have a thickness of no more than 100 μm, suitably no more than 80 μm, typically no more than 20 μm.

Suitably, the central region has a quadrilateral geometry, such as a rectangle or square, and the inner peripheral border region creates a frame around the central region. However, it will be understood that the central region can be of any geometric shape; the inner edge of the inner peripheral border region will then have the same geometric shape as the central region. The outer edge of the inner peripheral border region does not necessarily have to have a geometric shape corresponding to the shape of the inner edge; for example, the inner edge could be circular and the outer edge square. It will also be understood that that the inner edge of the outer peripheral border region will have the same geometric shape as the outer edge of the inner peripheral border region. The outer edge of the outer peripheral border region does not necessarily have to have a geometric shape corresponding to the shape of the inner edge; for example, the inner edge could be a square and the outer peripheral edge a more complex geometry.

Figure 1B:
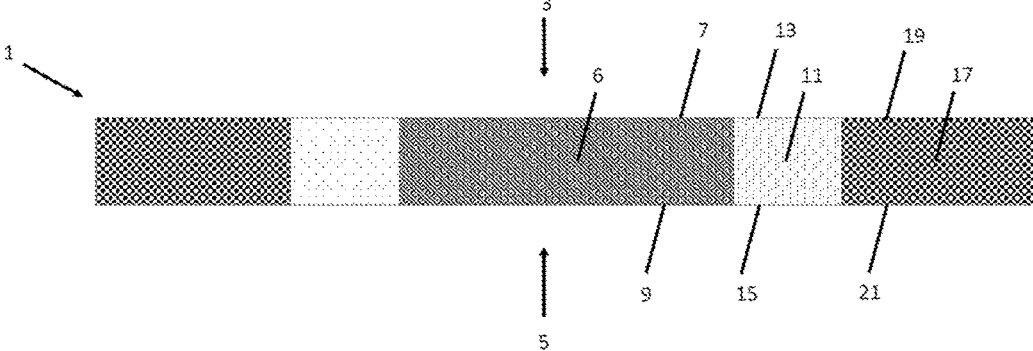
FIG. 1*b* is a cross-sectional view of the membrane-seal assembly shown in FIG. 1*a*.

FIG. 1a shows a plan view of a membrane-seal assembly of the invention and FIG. 1b shows a cross-section of the same membrane-seal assembly. The membrane-seal assembly 1 has a first side 3 and a second side 5. The central region 6 has a first face 7 and a second face 9 which correspond with the first and second sides 3 and 5 of the membrane-seal assembly respectively. The inner peripheral border region 11 surrounds the central region 6 and has a first face 13 and a second face 15 which correspond with the first and second sides 3 and 5 of the membrane-seal assembly. The outer peripheral border region 17 surrounds the inner peripheral border region and has a first face 19 and a second face 21 which correspond with the first and second sides 4 and 5 of the membrane-seal assembly respectively.

In the membrane-seal assembly shown in FIGS. 1a and 1b, the central region, inner peripheral border region and outer peripheral border region each independently have uniform thicknesses. Also, the first and second faces 7, 13 and 19 of the central region, the inner peripheral border region and the outer peripheral border region respectively are flush. Suitably, the first and second faces of each of these regions are in the same x-y plane respectively. Alternatively, the first and second faces of the central region may not be flush with the first and second faces of the inner peripheral border region respectively. In that case, the thickness of the central region is less than the thickness of the inner peripheral border region. Also, the first and second faces of the inner peripheral border region may not be flush with the first and second faces of the outer peripheral border region respectively. In that case, the thickness of the inner peripheral border region is less than the thickness of the outer peripheral border region.

The following alternative configurations to the configuration shown in FIGS. 1a and 1b are typical, in which the central region, inner peripheral border region and outer peripheral border region each independently have uniform thicknesses:

The first and second faces of the central region are not flush with the first and second faces of the inner peripheral border region respectively, and the first and second faces of the inner peripheral border region are flush with the first and second faces of the outer peripheral border region respectively, and the thickness of the central region is less than the thickness of the inner peripheral border region. The first and second faces of the inner and outer peripheral regions are in the same x,y-planes respectively, which are different from the x,y-planes of the first and second faces of the central region respectively;

The first and second faces of the central region are flush with the first and second faces of the inner peripheral border region respectively, and the first and second faces of the inner peripheral border region are not flush with the first and second faces of the outer peripheral border region respectively, and the thicknesses of the central and inner peripheral border region are the same and are less than the thickness of the outer peripheral border region. The first and second faces of the central and inner peripheral border regions are in the same x,y-planes respectively, which are different from the x,y-planes of the first and second faces of the outer peripheral border region respectively;

The first and second faces of the central region are not flush with the first and second faces of the inner peripheral border region respectively, the first and second faces of the inner peripheral border region are not flush with the first and second faces of the outer peripheral border region respectively, and the thickness of the central region is less than the thickness of the inner peripheral border region, and the thickness of the inner peripheral border region is less than the thickness of the outer peripheral border region. The first and second faces of the central, inner and outer peripheral border regions are all in different x,y-planes respectively.

The total planar area of the membrane-seal assembly will be dependent on the final use of the membrane-seal assembly and selection of a suitable overall planar area will be within the capability of the skilled person. Moreover, the dimensions of the central region and inner and outer peripheral border regions will be determined by the total planar area and will also be dependent on the final use of the reinforced membrane-seal assembly and selection of suitable dimensions will be within the capability of the skilled person. For example, the outer peripheral border region has a width that may be dependent on, in the case of a fuel cell, the fuel cell stack design in which it is used and may include porting or manifolding holes that permit fuel cell reactant inlet and product outlet. The inner peripheral border region is typically narrower than the outer peripheral border region.

A configuration can exist in which the inner peripheral border region does not have a uniform thickness. In that case, there is suitably a step in the first, second, or first and second faces of the inner peripheral border region. If there is a step in the first and second faces, then the steps are preferably aligned in the through-plane Cartesian z-direction. When the inner peripheral border region does not have a uniform thickness, the inner peripheral border region is divided into two regions, an inner region which is adjacent to the central region and an outer region which is adjacent to the outer peripheral border region, wherein the outer region preferably has a greater thickness than the inner region. Accordingly, the first, second, or first and second faces of the inner peripheral border region may be flush with the first, second, or first and second faces of the central region respectively as well as the first, second, or first and second faces of the outer peripheral border region respectively without the first, second, or first and second faces respectively of the central region and outer peripheral border region being in the same x,y-plane.

Figure 2A:
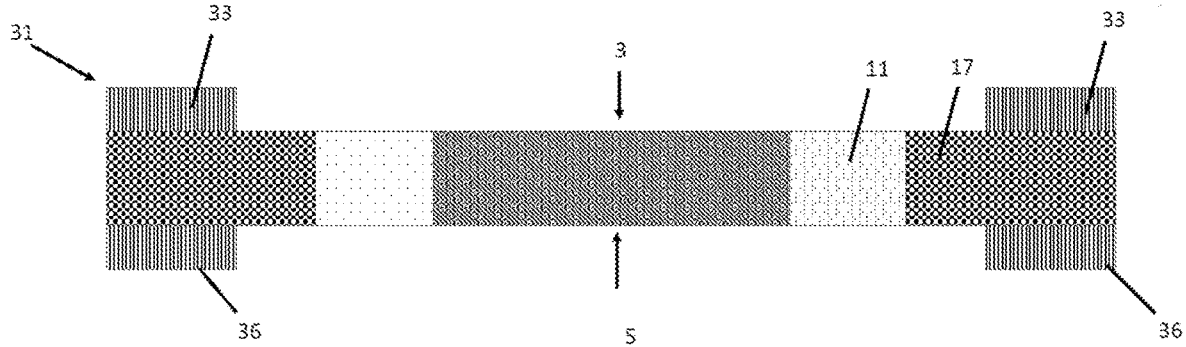
FIGS. 2*a* and *b* are cross-sectional views of sub-gasketed membrane-seal assemblies according to the invention.
Figure 2B:
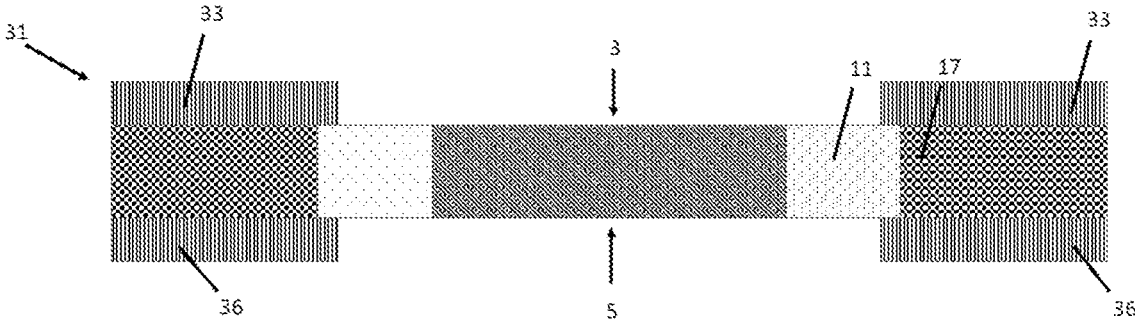

The second aspect of the invention provides a sub-gasketed membrane-seal assembly comprising a membrane-seal assembly of the invention and a sub-gasket applied on one or both sides of the outer peripheral border region or both the inner and outer peripheral border region. FIG. 2a shows an example of such a sub-gasketed membrane-seal assembly 31 in which a first sub-gasket 33 is present on the first side 3 of the membrane-seal assembly and a second sub-gasket 36 is present on the second side 5 of the membrane-seal assembly. In this case, the first and second sub-gaskets are in contact with and adhered to the outer peripheral border region 17 and do not overlap the inner peripheral border region 11. In FIG. 2b, the first and second sub-gaskets 33 and 36 overlap the inner peripheral border region 11 and are adhered to both the inner 11 and outer 17 peripheral regions. In addition to the configurations shown in FIGS. 2a and b, the sub-gasketed membrane-seal assembly of the invention may comprise a membrane-seal assembly having any configuration within the scope of the invention.

The sub-gasket is designed to provide additional strength and robustness to the edges of the membrane-seal assembly. The sub-gaskets may comprise any material which is compatible with the fuel cell environment. For example, the sub-gaskets must be able to withstand temperatures in the range of and including −20 to 180° C., suitably −20 to 120° C. as well as the presence of water, hydrogen and/or oxygen. Suitable materials include polyester, polyimide, polyethylene naphthalate and polyethylene terephthalate. The thickness of the sub-gaskets is not particularly limited but may suitably be in the range of and including 10 to 100 μm. The sub-gaskets are not required to have identical characteristics. For example, the sub-gaskets can have different thicknesses and/or be prepared from different materials. The sub-gaskets may also comprise features which facilitate handling or fuel cell operation. For example, the sub-gaskets may comprise apertures in the region of their respective peripheral edges These apertures may, for example, facilitate porting of gases in a fuel cell stack. These apertures may also facilitate handling of the sub-gasketed membrane-seal assemblies. The shape of the sub-gaskets is not particularly limited. Put another way, the peripheral edges of the first and second sub-gaskets may define any shape, and this shape is usually determined by the arrangement of parts in a particular fuel cell stack.

The sub-gasket may be applied as a coating from a solution or dispersion or applied as a bead from a viscous mixture onto the border region(s) using coating processes known to those in the art, or may be applied as a pre-formed picture frame film over the outer or both the inner and outer peripheral border regions. An adhesive layer may be used to assist adhesion of the sub-gasket. The adhesive layer may be an integral part of the sub-gasket, such that the sub-gasket and adhesive layer are applied in a single step, or the adhesive layer may first be applied to the outer peripheral border region or both the inner and outer peripheral border regions of the membrane-seal assembly and the sub-gasket subsequently applied to the adhesive layer. The sub-gaskets are adhered using any suitable adhesive, for example, a pressure sensitive adhesive, a heat sensitive adhesive, a UV activated adhesive or otherwise. For example, the adhesive layer may comprise acrylic pressure sensitive adhesives, rubber based adhesives, ethylene maleic anhydride copolymers, olefin adhesives, nitrile based adhesives, epoxy based adhesives, and urethane based adhesives.

Figure 3A:
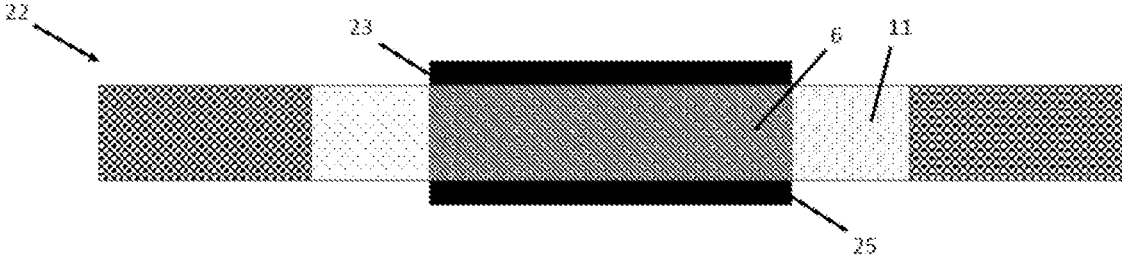
FIGS. 3*a-d* are cross-sectional views of catalysed membrane-seal assemblies according to the invention.
Figure 3B:
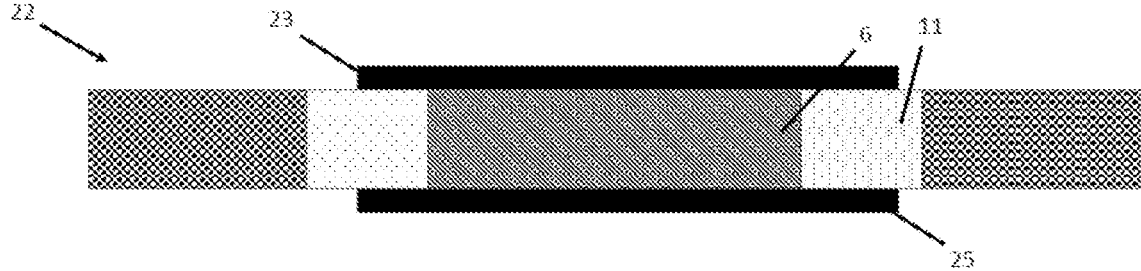
Figure 3C:
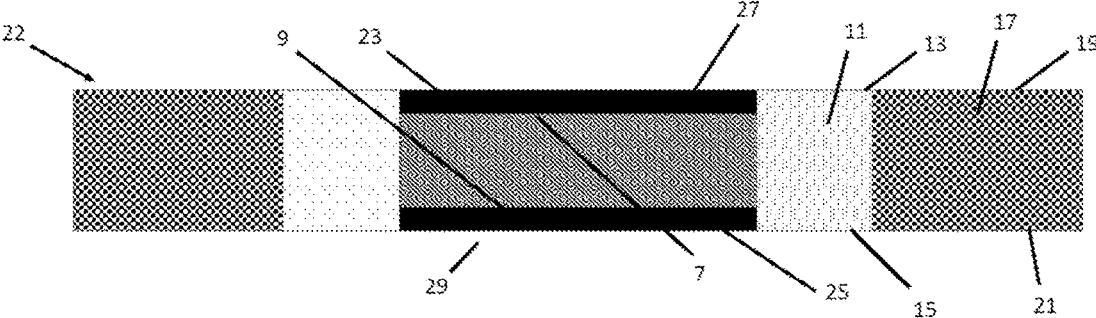

FIG. 3a shows a cross-section of a catalysed membrane-seal assembly 22 in which first and second catalyst layers 23 and 25 have been applied to the central region 6 of a membrane-seal assembly as shown in FIGS. 1a and b. These first and second catalyst layers 23 and 25 do not overlap the inner peripheral border region 11. FIG. 3b shows an alternative configuration in which the first and second catalyst layers 23 and 25 do overlap the inner peripheral border region 11. The configuration shown in FIG. 3a has the advantage that all of the catalyst material applied will be active as all of the layer is in contact with the electrolyte material. The design in FIG. 3b in which the catalyst layer overlaps the inner peripheral border region will have a lower catalyst utilisation but the step height caused by the termination of the catalyst layer is moved onto the inner peripheral border region and thus any stress caused by the step height will have a reduced effect on the interface between the central region and the inner peripheral border region. The catalysed membrane-seal assemblies shown in FIGS. 3c and 3d have different configurations of the central region, inner peripheral border region, outer peripheral border region as compared with FIGS. 3a and b. In FIG. 3c, the first and second faces 7 and 9 of the central region 6 are not flush with the first and second faces 13 and 15 of the inner peripheral border region 11, and the thickness of the central region 6 is less than the thickness of the inner peripheral border region 11. Additionally, the first and second faces 13 and 15 of the inner peripheral border region 11 are flush with the first and second faces 19 and 21 of the outer peripheral border region 17 and the thicknesses of the inner and outer peripheral border regions are the same. Accordingly, the first and second faces of the inner and outer peripheral border regions are in the same x,y-planes respectively. The reduced thickness of the central region 6 compared with the inner peripheral border region 11 allows the first and second catalyst layers 23 and to be applied to the central region 6 such that the first faces 27 and 29 of the first and second catalyst layers are flush with the first and second faces 13 and 15 of the inner peripheral border region 11 respectively.

Figure 3D:
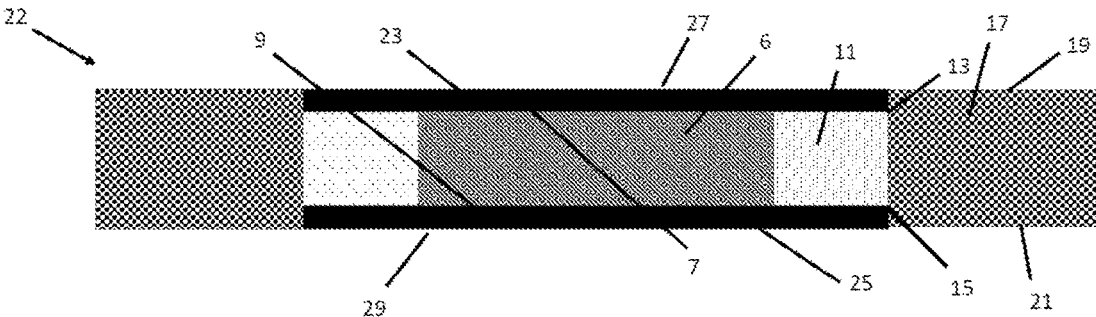

In FIG. 3d, the first and second faces 7 and 9 of the central region 6 are flush with the first and second faces 13 and 15 of the inner peripheral border region 11. Accordingly, the first and second faces central and inner peripheral border regions are in the same x,y-planes respectively. However, the first and second faces 13 and 15 of the inner peripheral border region 11 are not flush with the first and second faces 19 and 21 of the outer peripheral border region 17 and the thickness of the inner peripheral border region 11 is less than the outer peripheral border region 17. The reduced thickness of the central region 6 and the inner peripheral border region 11 with respect to the outer peripheral border region 17 allows the first and second catalyst layers 23 and 25 to be applied to the central region 6 such that the first faces 27 and 29 of the first and second catalyst layers 23 and 25 respectively are flush with the first and second faces 13 and 15 of the outer peripheral border region 17. The configurations shown in FIGS. 3c and 3d both have the advantage that there is no step height between the catalyst layers and the seal material. This means that when a gas diffusion layer is applied, it will be supported across its full width by the membrane-seal assembly i.e. there will not be a gap above the step in which the gas diffusion layer bridges between the catalyst layer and the membrane-seal assembly and is not supported. This prevents the materials of the membrane-seal assembly distorting into the gap. The configuration shown in FIG. 3c has the additional advantage that there is no catalyst material outside of the active area of the assembly, i.e. beyond the perimeter of the central region. In addition to the configurations shown in FIGS. 3a to d, the catalysed membrane-seal assembly of the invention may comprise a membrane-seal assembly having any configuration within the scope of the invention The catalyst layers in the catalysed membrane-seal assemblies of the invention comprise one or more electrocatalysts. The one or more electrocatalysts are independently a finely divided unsupported metal powder, or a supported catalyst wherein small catalyst nanoparticles are dispersed on an electrically conducting high surface area support, such as a particulate carbon black material. The exact electrocatalyst used will depend on the reaction it is intended to catalyse, and its selection is within the capability of the skilled person. The electrocatalyst may be a cathode or an anode electrocatalyst, preferably of a fuel cell or an electrolyser, more preferable a proton exchange membrane fuel cell or electrolyser. The thickness of a catalyst layer is not particularly limited and will depend on the intended application. In a fuel cell anode, the catalyst layer thickness is suitably at least 1 μm, typically at least 5 μm. In a fuel cell anode, the catalyst layer thickness is suitably no more than 15 μm, typically no more than 10 μm. In a fuel cell cathode, the catalyst layer thickness is suitably at least 2 μm, typically at least 5 μm. In a fuel cell cathode, the catalyst layer thickness is suitably no more than 20 μm, typically no more than 15 μm.

The electrocatalyst is suitably selected from:
  (i) the platinum group metals (platinum, palladium, rhodium, ruthenium, iridium and osmium);
  (ii) gold or silver;
  (iii) a base metal;

or an alloy or mixture comprising one or more of these metals or their oxides. A base metal is tin or a transition metal which is not a noble metal. A noble metal is a platinum group metal (platinum, palladium, rhodium, ruthenium, iridium or osmium) or gold. Preferred base metals are copper, cobalt, nickel, zinc, iron, titanium, molybdenum, vanadium, manganese, niobium, tantalum, chromium and tin. Typically, the electrocatalyst comprises a platinum group metal or an alloy of a platinum group metal, preferably with a base metal, preferred base metals as defined above. In particular, the electrocatalyst comprises platinum or an alloy of platinum with a base metal, preferred base metals as defined above, more preferably nickel or cobalt, most preferably nickel. The atomic ratio of platinum to alloying metal is typically in the range of and including 3:1 to 1:3. If the electrocatalyst is a supported catalyst, the loading of metal particles on the support material is suitably in the range 10-90 wt %, preferably 15-75 wt % of the weight of resulting electrocatalyst.

A catalyst layer preferably comprises an ion-conducting polymer, such as a proton-conducting ionomer, to improve the ion-conductivity of the layer. Accordingly, the ion-conducting material may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.) and perfluorosulphonic acid ionomer material supplied by 3M®), or ionomers based on partially fluorinated or non-fluorinated hydrocarbons that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Nafion® range available from Chemours company, especially Nafion® 1100EW, and the Aquivion® range available from Solvay, especially Solvay® 830EW.

A catalyst layer may comprise additional components. Such components include, but are not limited to: an oxygen evolution catalyst; a hydrogen peroxide decomposition catalyst; a hydrophobic additive (e.g. a polymer such as polytetrafluoroethylene (PTFE) or an inorganic solid with or without surface treatment) or a hydrophilic additive to control reactant and water transport characteristics. The choice of additional components will depend on whether the catalyst layer is for use at the anode or the cathode and it is within the capability of a skilled person to determine which additional components are appropriate.

Figure 4A:
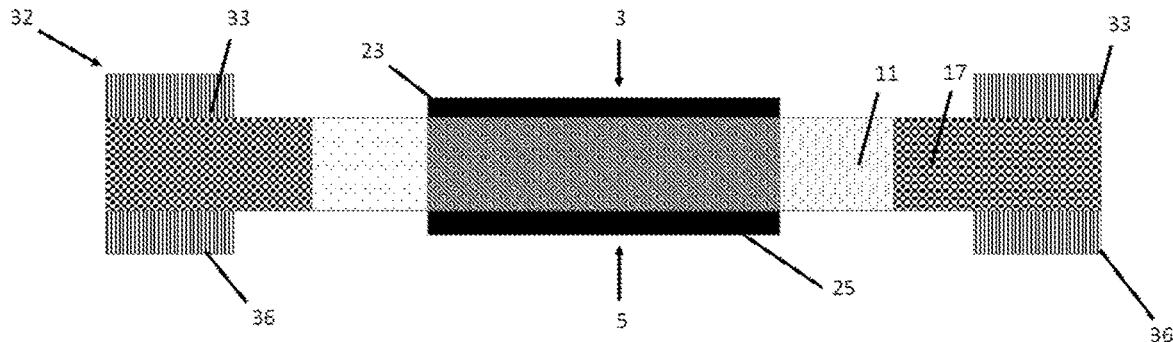
FIGS. 4*a* and *b* are cross-sectional views of sub-gasketed catalysed membrane-seal assemblies according to the invention.
Figure 4B:
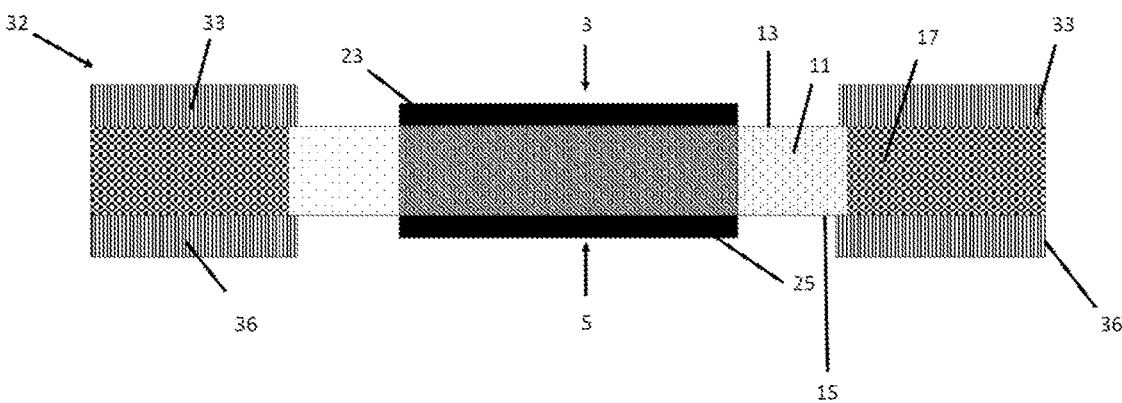

The fourth aspect of the invention provides a sub-gasketed catalysed membrane-seal assembly comprising a catalysed membrane-seal assembly of the invention, a first sub-gasket at the first side of the catalysed membrane-seal assembly and a second sub-gasket at the second side of the catalysed membrane-seal assembly. FIG. 4a shows an example of such a sub-gasketed catalysed membrane-seal assembly 32 in which a first sub-gasket 33 is present on the first side 3 of the catalysed membrane-seal assembly and a second sub-gasket 36 is present on the second side 5 of the membrane-seal assembly. In this case, the first and second sub-gaskets are in contact with and adhered to the outer peripheral border region 17 and do not overlap the inner peripheral border region 11. In FIG. 4b, the first and second sub-gaskets 33 and 36 overlap the inner peripheral border region 11 such that the first sub-gasket 33 is also in contact with the first face 13 of the inner peripheral border region and the second sub-gasket 36 is also in contact with the second face 15 of the inner peripheral border region. In this case, the first 33 and second 36 sub-gaskets are adhered to both the inner 11 and outer 17 peripheral regions.

Figure 5A:
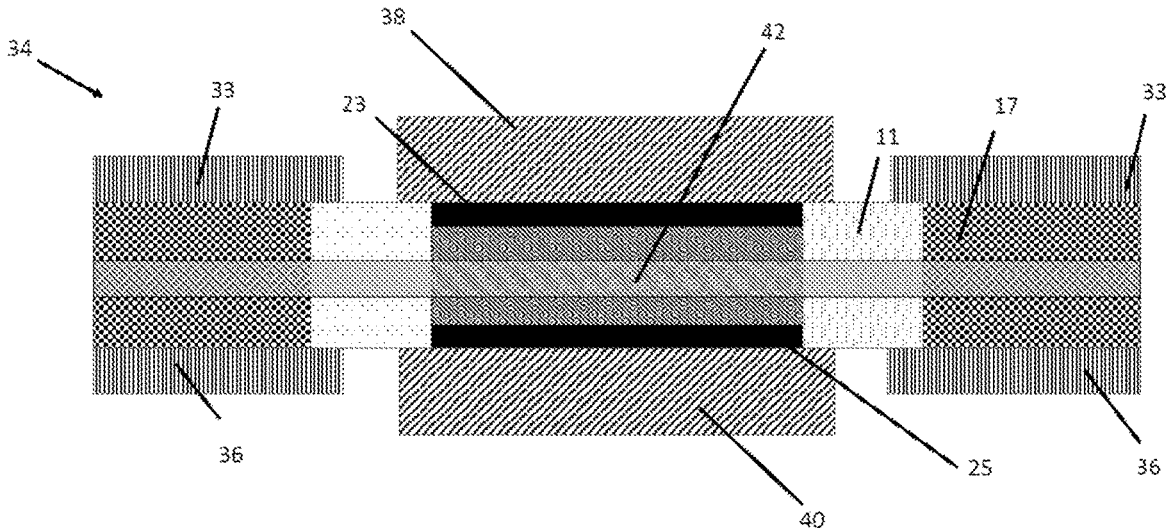
FIG. 5*a* is a cross-sectional view of a sub-gasketed membrane-seal electrode assembly according to the invention.

FIG. 5a shows an example of a sub-gasketed membrane-seal electrode assembly according to the fifth aspect of the invention. This particular sub-gasketed membrane-seal electrode assembly 32 has first and second gas diffusion layers 38 and 40 at the first and second sides of the sub-gasketed catalysed membrane-seal assembly. It can be seen in FIG. 5a that the lack of step height between the catalyst layers 23 and 25 and the membrane-seal assembly discussed above in connection with FIGS. 3c and 3d means that the gas diffusion layers are fully supported by the membrane-seal assembly. This particular sub-gasketed membrane-seal electrode assembly 36 also comprises a planar reinforcing component 42 which extends in to both the inner and outer peripheral border regions and does not span the full thickness of the sub-gasketed membrane-seal electrode assembly.

The gas diffusion layers comprise a gas diffusion substrate and, preferably, a microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a membrane-seal electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. Typical microporous layers comprise a mixture of a carbon black and a polymer such as polytetrafluoroethylene (PTFE).

In the sub-gasketed membrane-seal electrode assembly of the fifth aspect of the invention, the first and second gas diffusion layers preferably do not overlap the outer peripheral border region. An adhesive may be used to assist adhesion to the inner peripheral border region (and outer peripheral border region if applicable). The adhesive may be an integral part of the gas diffusion layers, such that the gas diffusion layer and adhesive layers are applied in a single step, or the adhesive layer may first be applied to the inner peripheral border region (and outer peripheral border region if applicable) and the gas diffusion layers subsequently applied to the adhesive layer.

The fuel cell of the sixth aspect of the invention is preferably a proton exchange membrane fuel cell. Although the invention is described primarily with respect to proton exchange membrane fuel cells, it will be appreciated that the membrane-seal assembly could be used in other electrochemical systems, such as electrolysers. In proton exchange membrane electrolysers, a voltage is applied across the membrane-seal electrode assemblies such that water supplied to the device is split into hydrogen and oxygen, at the cathode and anode respectively. The membrane-seal electrode assemblies may require different catalyst components to a proton exchange membrane fuel cell, such as Ir and Ru based materials at the anode, but are otherwise very similar in construction to proton exchange membrane for fuel cells.

In the method of the seventh aspect of the invention, the ion-conducting material, the first seal material, and the second seal material are each suitably deposited as a liquid or dispersion by any technique known to those skilled in the art. Such techniques include gravure coating, slot die (slot, extrusion) coating (whereby the coating is squeezed out under pressure via a slot onto the substrate), screen printing, rotary screen printing, inkjet printing, spraying, painting, bar coating, pad coating, gap coating techniques such as knife or doctor blade over roll (whereby the coating is applied to the substrate then passes through a split between the knife and a support roller), and metering rod application such as with a Meyer bar. Each of the ion-conducting material, the first seal material, and the second seal material may be deposited in two or more passes. Preferably, the ion-conducting material and the first seal material are deposited by inkjet printing, and may be deposited simultaneously to aid alignment of the central and inner peripheral border regions.

The ion-conducting material and the seal materials are dried individually after deposition of each material or may be dried after deposition of both the ion-conducting material and the first seal material or after deposition of all three of the ion-conducting material, the first seal material and the second seal material. If any material is deposited using two or more passes, there may be a step of drying after each pass. Drying, essentially to remove the solvent(s) from the ion-conducting or seal material coating dispersions, may be effected by any suitable heating technique known to those in the art, for examples air impingement, infra-red etc. Suitably, the drying step is carried out at a temperature in the range of and including 70 to 120° C. but will depend on the nature of the solvent and could be up to, or over, 200° C.

The first seal material, the second seal material and the ion-conducting material may be cured, in addition to being dried, to provide mechanical and chemical strength of the material. Curing is a chemical reaction to effect a change, such as crosslinking, and could be thermally activated (e.g. by heat or IR) or activated by UV. In addition, the ion-conducting material may be annealed, in addition to being dried (and optionally cured), to alter and strengthen the crystalline structure of the ion-conducting material. Any annealing step would employ elevated temperatures compared to the drying step, for example up to 200° C. The curing and/or annealing steps may be carried out after each drying step or at the end of the deposition process. Depending on the materials used for the seal materials and ion-conducting material, the curing and annealing may be effected in a single process.

The ion-conducting material, first seal material and second seal material may be deposited on a carrier material which does not form part of the final membrane-seal assembly, but is intended to be removed in a subsequent step; this step may be immediately after the membrane-seal assembly is formed or may be at some point downstream in the production process when the membrane-seal assembly is combined with other components e.g. a sub-gasket. The carrier material provides support for the membrane-seal assembly during manufacture and if not immediately removed, can provide support and strength during any subsequent storage and/or transport. The material from which the carrier material is made should provide the required support, is compatible with the ion-conducting material and seal materials, is impermeable to the ion-conducting material and seal materials, is able to withstand the process conditions involved in producing the membrane-seal assembly and is able to be easily removed without damage to the membrane-seal assembly. Examples of materials suitable for use include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene), and polyolefins, such as biaxially oriented polypropylene (BOPP). Other examples include laminates, multi-layer extrusions and coated films/foils capable of retaining their mechanical strength/integrity at elevated temperatures, for example temperatures up to 200° C. Examples include laminates of: poly(ethylene-co-tetrafluoroethylene) (ETFE) and polyethylene naphthalate (PEN); polymethylpentene (PMP) and PEN; polyperfluoroalkoxy (PFA) and polyethylene terephthalate (PET) and polyimide (PI). The laminates can have two or more layers, for example ETFE-PEN-ETFE, PMP-PEN-PMP, PFA-PET-PFA, PEN-PFA, FEP-PI-FEP, PFA-PI-PFA and PTFE-PI-PTFE. The layers may be bonded using an adhesive, such as acrylic or polyurethane.

If a planar reinforcing component is present in the membrane-seal assembly, this can suitably be applied to the ion-conducting material after deposition before formation of the central region. Suitable reinforcing component materials include planar porous materials, for example expanded polytetrafluoroethylene (ePTFE), for example as described in U.S. RE37307, embedded within the thickness of the membrane-seal assembly, to provide for improved mechanical strength of the membrane-seal assembly, such as increased tear resistance and reduced dimensional change on hydration and dehydration, and thus further increase the durability of a membrane-seal electrode assembly and lifetime of a fuel cell incorporating the membrane-seal assembly of the invention. The reinforcing component material and the first seal material are suitably different in the sense that they have different chemical compositions. Put another way, they are suitably different chemical substances. For example, the planar reinforcing component is suitably made from a material that is different to the first seal material. Similarly, the reinforcing component material and the second seal material are suitably different in the sense that they have different chemical compositions. For example, the planar reinforcing component is suitably made from a material that is different to the second seal material. Any planar reinforcing component present may extend across the entire thickness of the membrane-seal assembly or may extend across only a part of the thickness of the membrane-seal assembly. The planar reinforcing component may extend into the inner peripheral border region and may also extend into the outer peripheral border region.

In the method of the eighth aspect of the invention, the catalyst layer is suitably deposited onto the central region as an ink, either organic or aqueous (but preferably aqueous). Alternatively, the first catalyst layer can be applied by transfer of a previously prepared catalyst layer; for example a catalyst layer is applied onto a decal transfer substrate film (e.g. PTFE) and the catalyst layer is then transferred to the membrane-seal assembly of the invention by techniques involving pressure and temperature that are well known to those in the art.

In optional step (k) of the method of the ninth aspect of the invention, the catalyst component is suitably deposited onto the central region as an ink, either organic or aqueous (but preferably aqueous). Alternatively, the second layer can be applied by transfer of a previously prepared catalyst layer; for example a catalyst layer is applied onto a decal transfer substrate film (e.g. PTFE) and the catalyst layer is then transferred to the membrane-seal assembly of the invention by techniques involving pressure and temperature that are well known to those in the art.

The invention will be further described with reference to the following example which is illustrative and not limiting of the invention.

A membrane-seal assembly of the invention as shown in FIGS. 1a and b is fabricated as follows. A liquid dispersion of a perfluorosulphonic acid (PFSA) ion-conducting material in is coated as a thin layer onto a release film of a carrier material simultaneously with a solution of PVDF/HFP copolymer. These materials are dispensed using an inkjet system which allows the two liquids to be aligned with each other, with the PFSA material occupying the central region and the PVDF/HFP copolymer surrounding this and forming an inner peripheral border region. Once dried, both of these liquids form a 3 µm thick continuous film. A second layer of each material is coated on top of the first and whilst the second layer is still wet an ePTFE reinforcing component is placed on top of the second layer, the reinforcing component being held under tension. The reinforcing component is drawn down into the wet PFSA and PVDF/HFP layers so that all of the apertures in the reinforcing component are completely filled with PFSA or PVDF/HFP from the second coating once dried. After drying, final coatings of the PFSA dispersion and PVDF/HFP solution are applied to the upper surface of the reinforcing component and dried to ensure that the central region of the reinforcing component is fully encapsulated by material in the coated region. Finally, a UV curable polymer material poly(4-vinylphenol-co-methyl methacrylate) (PVP-co-PMMA) is dispensed using inkjet so that it forms an outer peripheral border region around the PVDF/HFP inner peripheral border region and cured using UV radiation. Once cured, the outer peripheral border region will be the same thickness as the central and inner peripheral border regions.

The invention claimed is:

1. A membrane-seal assembly comprising a first side and second side, the membrane-seal assembly comprising:
  (i) a central region having a first face and a second face which correspond with the first and second sides of the membrane-seal assembly respectively, the central region comprising an ion-conducting material;
  (ii) an inner peripheral border region having a first face and a second face which correspond with the first and second sides of the membrane-seal assembly respectively, the inner peripheral border region comprising a first seal material, wherein the inner peripheral border region surrounds the central region in a plan view but does not overlap the first face or the second face of the central region;
  (iii) an outer peripheral border region having a first face and a second face which correspond with the first and second sides of the membrane-seal assembly respectively, the outer peripheral border region comprising a second seal material, wherein the outer peripheral border region surrounds the inner peripheral border region;
  wherein the first and second seal materials are different.

2. The membrane-seal assembly according to claim 1, wherein the first seal material has a Young's modulus which is less than the Young's modulus of the second seal material.

3. The membrane-seal assembly according to claim 2, wherein the first seal material has a Young's modulus which is greater than the Young's modulus of the ion-conducting material in the central region.

4. The membrane-seal assembly according to claim 1, wherein the first and second faces of the central region are flush with the first and second faces of the inner peripheral border region respectively.

5. The membrane-seal assembly according to claim 1, wherein the first and second faces of the central region are not flush with the first and second faces of the inner peripheral border region respectively and the thickness of the central region is less than the thickness of the inner peripheral border region.

6. The membrane-seal assembly according claim 1, wherein the first and second faces of the inner peripheral border region are flush with the first and second faces of the outer peripheral border region respectively.

7. The membrane-seal assembly according to claim 1, wherein the first and second faces of the inner peripheral border region are not flush with the first and second faces of the outer peripheral border region respectively and the thickness of the inner peripheral border region is less than the thickness of the outer peripheral border region.

8. The membrane-seal assembly according to claim 1 further comprising a planar reinforcing component in the central region.

9. The membrane-seal assembly according to claim 8, wherein the planar reinforcing component extends into the inner peripheral border region.

10. The membrane-seal assembly according to claim 9, wherein the planar reinforcing component extends into the outer peripheral border region.

11. A sub-gasketed membrane-seal assembly comprising a membrane-seal assembly according to claim 1, a first sub-gasket at the first side of the membrane-seal assembly and a second sub-gasket at the second side of the membrane-seal assembly, wherein the first sub-gasket is in contact with the first face of the outer peripheral border region and the second sub-gasket is in contact with the second face of the outer peripheral border region.

12. The sub-gasketed membrane-seal assembly according to claim 11, wherein the first and second sub-gaskets overlap the inner peripheral border region, the first sub-gasket is in contact with the first face of the inner peripheral border region and the second sub-gasket is in contact with the second face of the inner peripheral border region.

13. A catalysed membrane-seal assembly comprising a membrane-seal assembly according to claim 1 and a first catalyst layer on the first face of the central region, wherein the catalyst layer has first and second faces, wherein the second face of the catalyst layer is in contact with the first face of the central region.

14. The catalysed membrane-seal assembly according to claim 13, wherein the first catalyst layer overlaps the inner peripheral border region and the second face of the first catalyst layer is in contact with the first face of the inner peripheral border region.

15. The catalysed membrane-seal assembly according to claim 13 further comprising a second catalyst layer on the second face of the central region, wherein the second catalyst layer has first and second faces, wherein the second face of the second catalyst layer is in contact with the second face of the central region.

16. The catalysed membrane-seal assembly according to claim 15, wherein the second catalyst layer overlaps the inner peripheral border region and the second face of the second catalyst layer is in contact with the second face of the inner peripheral border region.

17. A catalysed membrane-seal assembly according to claim 15 wherein the first face of the second catalyst layer is flush with the second face of the inner peripheral border region.

18. The catalysed membrane-seal assembly according to claim 13, wherein the first face of the first catalyst layer is flush with the first face of the inner peripheral border region.

19. A sub-gasketed catalysed membrane-seal assembly comprising a catalysed membrane-seal assembly according to claim 13, a first sub-gasket at the first side of the catalysed membrane-seal assembly and a second sub-gasket at the second side of the catalysed membrane-seal assembly, wherein the first sub-gasket is in contact with the first face of the outer peripheral border region and the second sub-gasket is in contact with the second face of the outer peripheral border region.

20. The sub-gasketed catalysed membrane-seal assembly according to claim 19, wherein the first and second sub-gaskets overlap the inner peripheral border region, the first sub-gasket is in contact with the first face of the inner peripheral border region and the second sub-gasket is in contact with the second face of the inner peripheral border region.

21. The sub-gasketed membrane-seal electrode assembly comprising a sub-gasketed catalysed membrane-seal assembly according to claim 19, a first gas diffusion layer at the first side of the sub-gasketed catalysed membrane-seal assembly and a second gas diffusion layer at the second side of the sub-gasketed catalysed membrane-seal assembly.

22. The sub-gasketed membrane-seal electrode assembly according to claim 21, wherein the first and second gas diffusion layers do not overlap the outer peripheral border region.

23. The sub-gasketed membrane-seal electrode assembly according to claim 21, wherein the first and second gas diffusion layers are bonded to the first and second faces of the inner peripheral border region respectively.

24. A fuel cell comprising a membrane-seal assembly according to claim 1.

25. The fuel cell according to claim 24, wherein the fuel cell is a proton exchange membrane fuel cell.

\* \* \* \* \*